Aug. 12, 1969     J. W. LINK     3,460,822

VACUUM WORKHOLDER

Filed Oct. 23, 1965

INVENTOR
JACK W. LINK

BY *[signature]*

ATTORNEY

United States Patent Office 3,460,822
Patented Aug. 12, 1969

3,460,822
VACUUM WORKHOLDER
Jack W. Link, Utica, Mich., assignor to E & E Engineering Company, Detroit, Mich., a corporation of Michigan
Filed Oct. 23, 1965, Ser. No. 502,906
Int. Cl. B25b 1/00; B65h 3/08; B23b 31/30
U.S. Cl. 269—21                              3 Claims

ABSTRACT OF THE DISCLOSURE

A workholder comprising a rod having a vacuum cup for engaging the workpiece on one end of a piston disposed in an actuating cylinder on its opposite end. A source of vacuum is connected to the cylinder and to the vacuum cup by a bore extending through the rod from the cylinder. The surface of the cup initially engaging the workpiece is greater than the piston area exposed to the vacuum so that the workpiece is securely engaged with the cup before the piston is moved in the cylinder.

---

This invention relates to a workholder adapted to secure and position a workpiece through vacuum means.

Workholders which grasp a workpiece by means of a vacuum induced in a flexible cup are often used to retain parts for machining operations or fabricating operations such as welding. When the workpiece being operated on is fairly flexible as is the case in operations involving automotive body panels formed of sheet metal, it is common practice to support the vacuum cup on some form of linear actuator in an arrangement whereby the vacuum cup may engage the workpiece while it is in the general area of its desired position during the operation. Then the actuator moves the vacuum cup so as to draw the workpiece into its exact desired position, often by moving against some reference surface.

Difficulty has been encountered in operating devices of this sort because of the tendency of the linear actuator to separate the vacuum cup from the workpiece during the positioning motion. The force of adherence of the vacuum cup to the workpiece is practically limited if the vacuum is generated from the plant pressurized air source. Variations in the air line pressure caused by the operation of other devices on the line often result in momentary pressure drops which in turn reduce the vacuum supplied to the cup. If such vacuum drops occur while the linear actuator is moving the workpiece into position, or retaining it in that position against the resiliency of the workpiece and/or pressures exerted against it by the operating mechanism, the vacuum cup may become separated from the workpiece, possibly resulting in a deformation of the workpiece by the operating mechanism.

It is accordingly the broad object of the present invention to provide a combination vacuum cup workholding device and linear actuator which is inherently incapable of withdrawing the vacuum cup from the workpiece under the force of the actuator. It is a further object to provide such a device wherein the linear actuator constitutes a piston movable within a cylinder, energized by the same vacuum source which retains the cup to the workpiece.

As described in detail in the subsequent disclosure of the preferred embodiment of my invention, the inventive device takes the form of a flexible, circular, concave vacuum cup fixed to the rod of a piston. The piston is movable within a cylinder and is normally spring biased so that its rod is in an extended position with respect to the cylinder. The vacuum, or negative pressure, is normally developed in a venturi device connected to the plant air supply and is admitted to the chamber of the cylinder behind the piston.

The piston and the piston rod have a central passage which connects the cylinder chamber to a flat surface disposed in the center of the vacuum cup. The end of the cylinder beyond the piston is exposed to the atmosphere. When a workpiece is brought into rough position so that its surface covers the vacuum cup, and the vacuum producing device is connected to the chamber of the cylinder so that air is withdrawn from the cylinder chamber, the initial action of the device is to retract the workpiece against the flat surface containing the end of the central air passage at the center of the vacuum cup. Until this occurs, the piston is not drawn through the cylinder chambers so as to retract its rod as the spring pressure restrains the piston against the feeble vacuum force which is exerted against the piston. However, when the workpiece is drawn fully down by the vacuum cup, against the end of the central passage, the passage is closed off and the full vacuum force is then directed against the piston retracting it against the spring pressure, and drawing the workpiece toward the cylinder. In the preferred embodiment the diameter of the vacuum cup is substantially greater than the diameter of the piston so that the vacuum is operating on a larger area of the workpiece than of the piston and the cup is accordingly retained to the workpiece by a force inherently greater than the linear actuation force. If the workpiece is very rigid, or strikes an obstacle, or otherwise resists the actuation force so that the cup does begin to draw away from the workpiece, the breaking of the seal between the cup and the workpiece immediately allows air to pass into the cylinder chamber behind the piston and accordingly decreases or terminates the actuation force. In this manner a signal device such as a limit switch, operative to indicate that the piston is in retractive position, will also positively indicate that the workpiece is attached to the vacuum cup as no retraction can occur unless the workpiece first seals the end of the air passage. In this manner the device may be seen to have an automatic valve action which prevents vacuum pressure from being applied to the actuator unless a workpiece is fully drawn to the vacuum cup.

A further object of the present invention is to provide a vacuum cup workholder and retractor for the workholder, wherein the retractor consists of a piston moving within a cylinder and the vacuum cup is supported on the cylinder rod.

Another object is to provide such a device wherein an air passage exists between the chamber side of the piston and the center of the vacuum cup so that a single vacuum source energizes both the piston and the vacuum cup and automatic valving occurs so that no substantial vacuum force is exerted on the piston until the workpiece is firmly engaged by the vacuum cup.

Other objects, advantages and applications of the present invention will be made apparent by the following description of a preferred embodiment to the invention. The description makes reference to the accompanying drawings in which.

Figure 1:
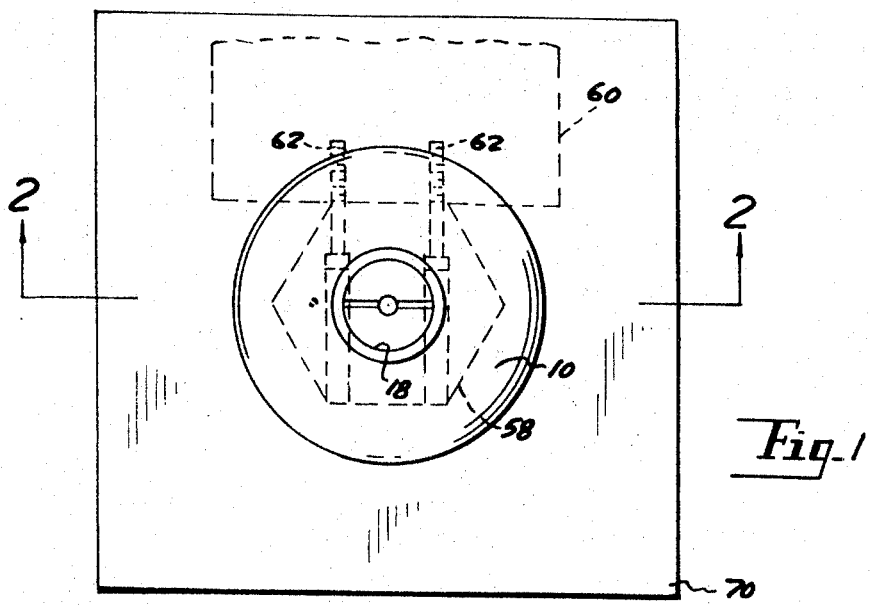
FIGURE 1 is a top view of a device formed in accordance with the present invention.
Figure 2:
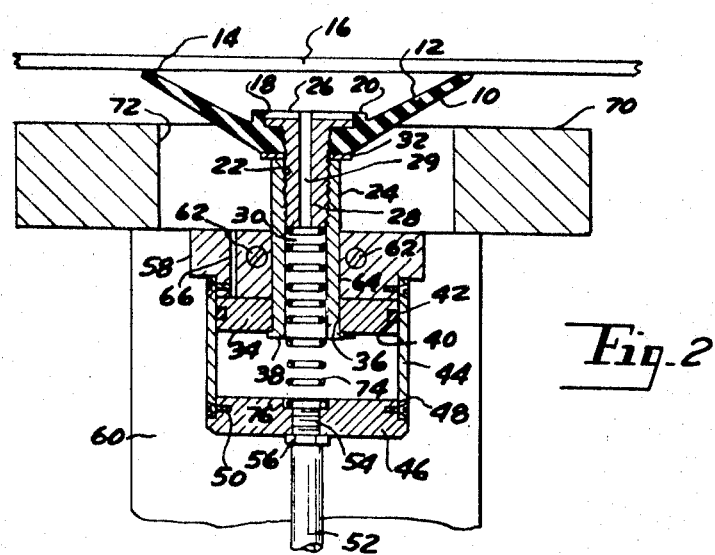
FIGURE 2 is a sectional view of the device taken along lines 2—2 of FIGURE 1.
Figure 3:
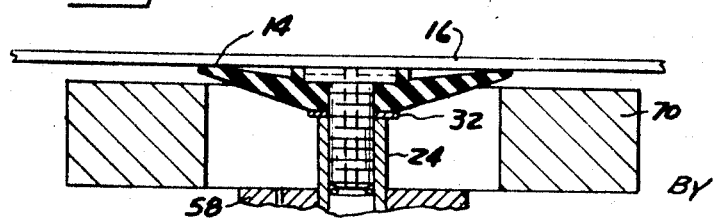
FIGURE 3 is a fragmentary sectional view of the device showing the workpiece drawn against the central air passage.

The device employs a vacuum cup 10 formed of a resilient rubber-like material. The vacuum cup 10 is circular and has an upwardly extending concave surface 12. The extreme outer edges 14 are tapered to provide a flexibility of contact with a flat sheet-like workpiece 16. A central depression 18 is formed in the middle of the cup and a shallow, circular ridge 20 extends about the depression.

A central opening 22 which passes through the thickness of the cup 10 communicates with the depression 18.

The cup 10 is retained on a cylindrical piston rod 24 by means of a nut-like adapter which has a flat head 26 with dimensions similar to depression 18 and a threaded shaft 28 that passes through the central aperture 22 in the cup 10. The shaft 28 is threaded and screws into the threaded end of a central passage 30 formed through the rod 24. A washer 32 is disposed between the cup 10 and in the rod 24 and acts to provide a backing surface for the cup. The upper surface of the adapter head 26 is slightly below the upper surface of the ridge 20.

The shaft 28 has a central air passage 29 formed along its axis. The other end of the rod 24 is fixed to a piston 34 by means of a central hole 36 in the piston. The shoulder 38 on the lower end of the rod 24 abuts the surface of the piston and the rod is press fitted within the aperture 36.

The piston has a groove 40 extending about its outer perimeter and an O ring 42 is seated within the groove and bears against the interior wall of the cylinder 44. The end of the cylinder opposite to that through which the rod projects is enclosed by a cylindrical cap end 46 which has a formed shoulder 48 that fits within the cylinder and is retained by screws 50.

A vacuum line 52 is fitted to a threaded hole 54 in the cap end by means of a fitting 56. The tube 52 connects to some vacuum pump means (not shown) such as an aspirator type device connected to a plant air source. The rod end of the cap is formed by a cylindrical section 58 which is joined to a supporting surface by a pair of transversely extending mounting screws 62. The end cap 58 has a central aperture 64 which passes the cylinder rod 24. The rod makes a sliding fit within the aperture 64 and no particular seal is required.

The rod end cap 58 has an air passage 66 connecting its inner and outer sides so as to maintain the adjacent side of the piston at atmospheric pressure independently of the motion of the piston.

A reference surface 70 having a central aperture 72 through which the cup 10 may pass is disposed below the extended position of the cup and is designed to support the margins of the workpiece around the cup 10 at such times as the cup is retracted.

The piston 34 and the cup 10 are normally maintained in an extended position by a spring 74 which extends through the aperture 30 in the rod 24 and bottoms against the threaded adapter end 28 and has its other end bottomed in a groove 76 in the center of the end cap 46. Any retraction of the piston within the cylinder 44 must work against the force of the spring 74.

It should be noted that the diameter of the cup 10 is substantially greater than the diameter of the piston 34. Preferably, the diameters are such that the area of the cup 10 is twice that of the piston surface. As will be noted, this results in a substantially greater force being exerted on the workpiece 16 than on the piston 34.

In operation, prior to the introduction of vacuum through the line 52, a workpiece 16, preferably, but not necessarily, a relatively thin sheet material, is brought into approximate position with respect to an operating mechanism by locating it in some manner so that one surface lies over the cup 10. It should be understood that one or more other vacuum work holders of the same general nature as that disclosed on the invention may be associated on a single fixture so that a workpiece may rest on and be positioned by several simultaneously.

When a workpiece is properly positioned with respect to the cup 10, suitable control mechanism (not shown) introduces a vacuum into the volume of the cylinder 44 behind the piston 34 through the line 52. This vacuum exhausts the air from the cylinder volume and also from the volume within the cup through the passage 29 and the central aperture 30 in the piston rod. At this point the force exerted by the vacuum on the piston, or more correctly by the differential in pressure caused by the atmosphere working on one side of the piston through the passage 66 and the vacuum on the other side of the piston, is not sufficient to overcome the force of the spring 74. As long as air is being introduced into the cylinder volume from the volume within the concavity of the cup 10, this same condition exists. Meanwhile, the atmospheric pressure on the outer side of the workpiece 16 causes it to be pressed down against the flexible edges 14 of the cup 10 until the workpiece seats on the ridge 20 surrounding the head 26 of the adapter 28. When this occurs the end of the passage 29 is closed off and the full vacuum force begins to operate on the piston 34. This causes the piston to move downwardly, overcoming the bias of the spring 74, and lowering the workpiece until it abuts the reference surface 70. This surface may be so located that the piston 34 bottoms against the end plate 46 at the same time.

During this motion, if the cup 10 becomes dissociated from the workpiece, air is again admitted into the volume within the cup and through the passage 29 to the cylinder volume, terminating the motion of the cylinder and allowing the piston to return to its initial position under spring pressure.

When the operation has become completed and the workpiece 16 is to be removed from the cup, the vacuum is no longer introduced through the line 52 and the cup 10 moves upwardly and simultaneously releases the workpiece.

It is thus seen that a preferred embodiment of the present invention provides a device which grasps a workpiece and positions it with a linear motion from a single vacuum source, and is so designed that the actuation motion cannot pull the vacuum cup away from the workpiece.

Having thus described my invention I claim:

1. A device for holding and positioning a workpiece, comprising:
    (a) a cylinder;
    (b) a piston disposed in said cylinder for reciprocal movement;
    (c) a rod having one end connected to the piston;
    (d) an adapter having a flat head for engaging the workpiece joined to the other end of the rod;
    (e) a vacuum cup with a concave side bounded by a circular edge for engaging the workpiece mounted on the end of the rod by the adapter with the flat head recessed in the cup when separated from the workpiece the circular edge of the cup being capable of flexing to a position coplanar with the flat head;
    (f) a passage extending axially through the rod and opening to the flat head of the adapter for connecting the concave side of the cup with the volume of the cylinder on one side of the piston;
    (g) means for evacuating the air from the concave side of the cup to apply a vacuum to the surface of a workpiece engaged with the circular edge of the cup so that the workpiece abuts the head of the adapter to close said passage and thus retain the magnitude of vacuum produced between the cup and the workpiece to thereafter cause the piston to be moved in a first direction relative to the cylinder; and
    (h) means for biasing the piston in the reverse direction relative to the cylinder.

2. A device as defined in claim 1, wherein the cup has a circular resilient ridge extending upwardly from its center around the head of the adapter and above the head to engage the workpiece when the workpiece is in abutment with the head to provide a seal between the workpiece and the head to sealingly close said passage.

3. A device as defined in claim 2, wherein the area of the piston exposed to the vacuum is greater than the area of the flat head of the adapter and less than the surface of the workpiece bounded by the circular edge of the cup so that the application of a vacuum on the side of the piston connected with the concave side of the cup initially causes the workpiece to move toward the adapter until the circular ridge engages the workpiece to seal said passage and then causes the piston and the workpiece to move relative to the cylinder.

References Cited

UNITED STATES PATENTS

| | | |
|---|---|---|
| 1,448,690 | 3/1923 | Hetzer. |
| 3,084,928 | 4/1963 | Opitz _____ 269—21 |
| 2,737,389 | 3/1956 | Evans _____ 271—26 X |
| 2,976,037 | 3/1961 | Seel. |

FOREIGN PATENTS 145,406  2/1952  Australia.

ROBERT C. RIORDON, Primary Examiner

J. F. McKEOWN, Assistant Examiner

U.S. Cl. X.R.

271—26; 279—3